United States Patent [19]

Adam

[11] Patent Number: 4,510,215
[45] Date of Patent: Apr. 9, 1985

[54] CASING FOR A BATTERY OF CYLINDRICAL ELECTRIC CELLS

[75] Inventor: Michel Adam, Gournay, France

[73] Assignee: SAFT, Romainville, France

[21] Appl. No.: 448,628

[22] Filed: Dec. 10, 1982

[30] Foreign Application Priority Data

Jan. 14, 1982 [FR] France ............... 82 00528

[51] Int. Cl.³ ............................................. H07M 2/10
[52] U.S. Cl. ..................................... 429/99; 429/48;
429/97; 429/100; D13/4; D13/8; D13/11
[58] Field of Search ................... 429/9, 48, 96, 97, 99,
429/100; D13/4, 8-11

[56] References Cited

U.S. PATENT DOCUMENTS

| | | | |
|---|---|---|---|
| 3,181,974 | 5/1965 | La Barbera | 429/100 |
| 3,342,645 | 9/1967 | Godard | 429/99 |
| 4,123,598 | 10/1978 | Hammel | 429/99 X |
| 4,383,007 | 5/1983 | Murphy | 429/96 X |
| 4,407,911 | 10/1983 | Hooke | 429/99 X |

FOREIGN PATENT DOCUMENTS

| | | | |
|---|---|---|---|
| 1336265 | 7/1963 | France | 429/97 |
| 2369693 | 5/1978 | France | 429/160 |
| 570003 | 12/1957 | Italy | 429/99 |

Primary Examiner—Brian E. Hearn
Assistant Examiner—Stephen J. Kalafut
Attorney, Agent, or Firm—Kenyon & Kenyon

[57] ABSTRACT

A casing for a battery of cylindrical electric cells lying parallel to one another includes two insulating half casings each formed by one or more modules (2) having n or n+1 recesses in the form of part cylindrical cavities. The modules have two end edges and have respective complementary interfitting portions (24, 25) enabling two modules to be connected end-to-end. Each module further has two base plates (26, 27) orthogonal to the axes of said part cylindrical cavities and having complementary fixing parts (28, 29). A casing having any number of cell-receiving recesses greater than one can be assembled from modules having n and n+1 part cylindrical cavities, where n is equal to 2.

14 Claims, 6 Drawing Figures

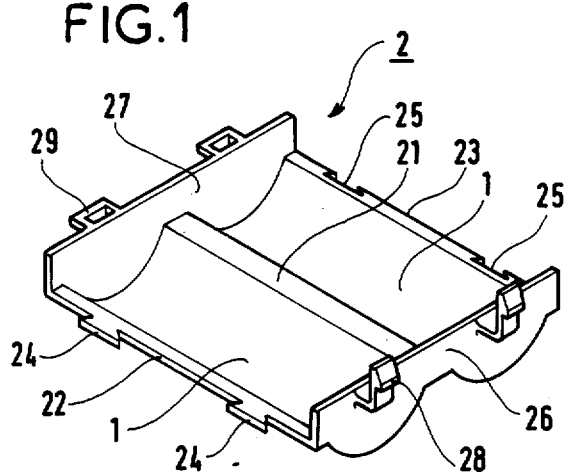
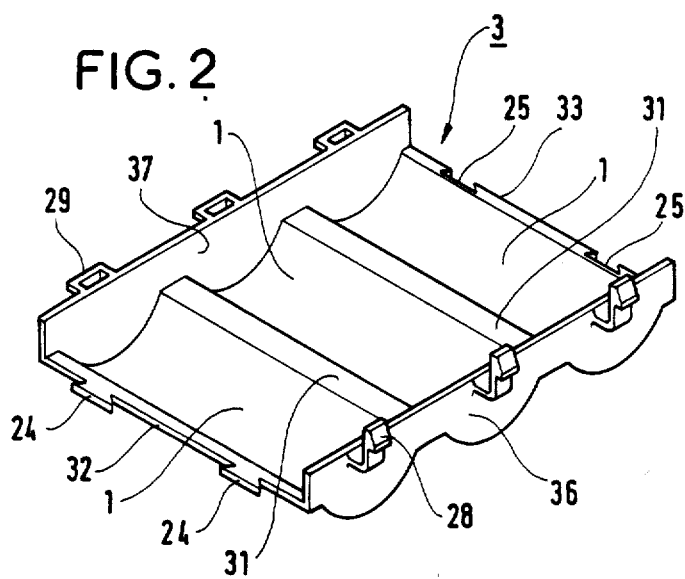

CASING FOR A BATTERY OF CYLINDRICAL ELECTRIC CELLS

The present invention relates to a casing for a battery of electric cells, be they primary cells or storage cells. It relates more particularly to cylindrical electric cells of any desired size which are installed side by side so as to form one or more rows.

BACKGROUND OF THE INVENTION

One of the problems is to provide sufficient mechanical cohesion between a plurality of electric cells which are electrically connected in parallel or in series by means of electric connections.

As is well known, when electric cells have an insulating outer sheath, they can be held together by glue or else by strapping them together using ribbon, adhesive tape, or heat-shrinkable sleeves, etc. These means require tooling suited to the particular number of electric cells which are used to constitute the battery.

When electric cells have no insulating sheath, it is essential to keep two electric cells a sufficient distance spart to isolate them from each other. For example, French Pat. No. 2 369 693 describes a casing with a container closed by a lid and having inner compartments which separate the electric cells from one another. It is obvious that a specific type of casing must be provided for each size of battery constituted by a given number of electric cells.

Preferred embodiments of the present invention provide a battery casing which can be used for any number of electric cells of the same size, regardless whether they are fitted with insulating sheaths and which makes it unnecessary to have tooling in all sorts of different sizes together with fixing accessories such as glue, bonding material tape, etc.

SUMMARY OF THE INVENTION

The present invention provides a casing for a battery of cylindrical electric cells lying parallel to one another, wherein the casing comprises interconnected first and second insulating half casings with each half casing comprising at least one module having n or n+1 part cylindrical cell-receiving cavities extending parallel to one another between base plates which are orthogonal to the axes of said part cylindrical cavities, the end edges of the modules being provided with respective first complementary interfitting portions to enable a plurality of modules to be connected end-to-end to increase the number of side-by-side cell-receiving cavities in a half casing, and the base plates being provided with respective second complementary interfitting portions to enable the first and second half casings of any one battery to be assembled to each other.

In one embodiment, said cavities are separated by one less intermediate rib than there are cavities, said ribs being of a thickness such that they provide sufficient electric insulation between two neighbouring electric cells.

In a variant, said second complementary interfitting portions are of the latch and eye type and said first complementary portions designed to fit together are of the dovetail mortise and tenon type.

The casing may be closed at its ends by two end plates which co-operate with the end edges of the end modules.

A casing in accordance with the invention may contain a single row of electric cells, but the height of said orthogonal base plates may be chosen so that said casing contains at least two superposed rows of electric cells.

BRIEF DESCRIPTION OF THE DRAWINGS

Other features and advantages of the present invention become apparent from the following description of embodiments given by way of non-limiting example and in which the chosen value of n is 2:

In the accompanying drawings:

FIG. 1 is a perspective illustration of a module with two cavities;

FIG. 2 is a perspective illustration of a module with three cavities;

MORE DETAILED DESCRIPTION

Figure 3:
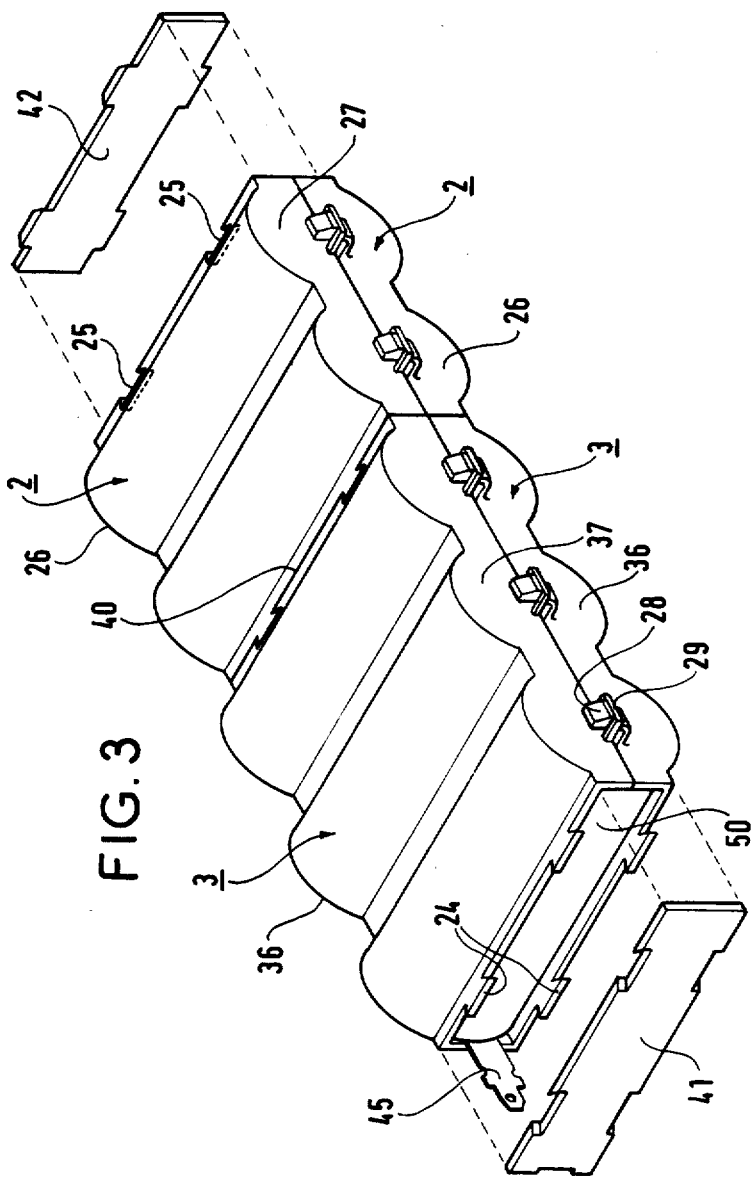
FIG. 3 is a perspective illustration of one type of casing in accordance with the invention.

FIG. 1 shows an insulating module 2 with two partially cylindrical cavities 1 separated by an intermediate rib 21. End edges 22 and 23 have complementary portions 24–25 in the form of dovetail tenons and mortises which are capable of co-operating with the edges of other modules juxtaposed thereto. The module 2 has two base plates 26 and 27 which are orthogonal to the axes of the cavities 1. The base plate 26 is provided with resilient latches 28, and the base plate 27 is provided with latch-receiving eyes 29.

FIG. 2 illustrates an insulating module 3 with three cavities 1; ribs 31 are analogous to the rib 21 in module 1. The module has end edges 32 and 33 with dovetail tenons 24 and dovetail mortises 25 and base plates 36 and 37 which are provided with latches 28 and eyes 29. One latch 28 and one eye 29 is provided for each cavity 1; they are located at opposited ends thereof.

FIG. 3 is a perspective illustration of an insulating casing in accordance with the invention and designed to accomodate five electric cells lying parallel to one another. The casing is formed by upper and lower half casings each constituted by a module 3 snap fitted end on to a module 2 along a line 40.

The casing is closed at its ends by two insulating end plates 41 and 42 which co-operate with the tenons 24 and the mortises 25 of the end edges of the modules 3 and 2. A metal output terminal 45 is schematically illustrated fixed to the casing, but any other analogous terminal arrangement can be envisaged.

Figure 4:
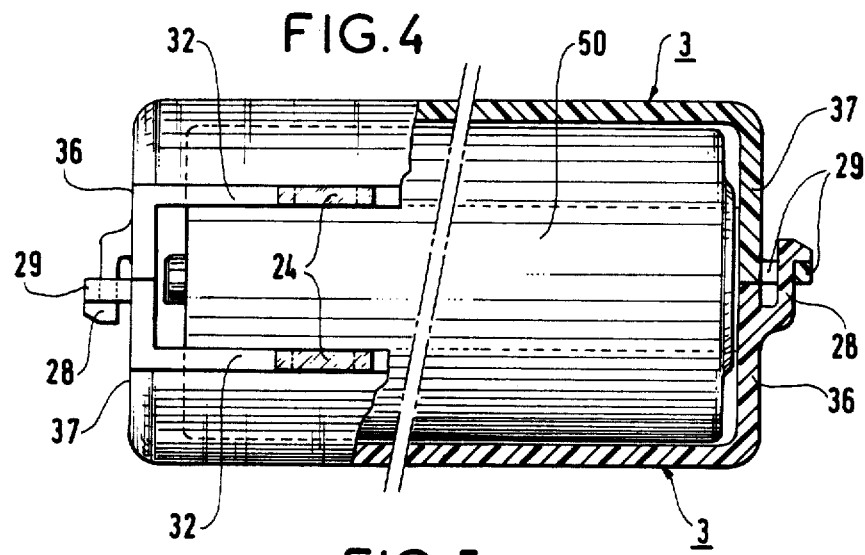
FIG. 4 is a partial cross-section through the casing of FIG. 3.

FIG. 4 illustrates more presely how the upper half casing 3 is fixed to the lower half casing 3. (It also illustrates an electric cell 50).

The modules 2 and 3 make it possible to produce a casing which contains any number of electric cell-receiving cavities greater than one without its being necessary to use complicated fixing accessories specific to a particular number of electric cells.

Figure 5:
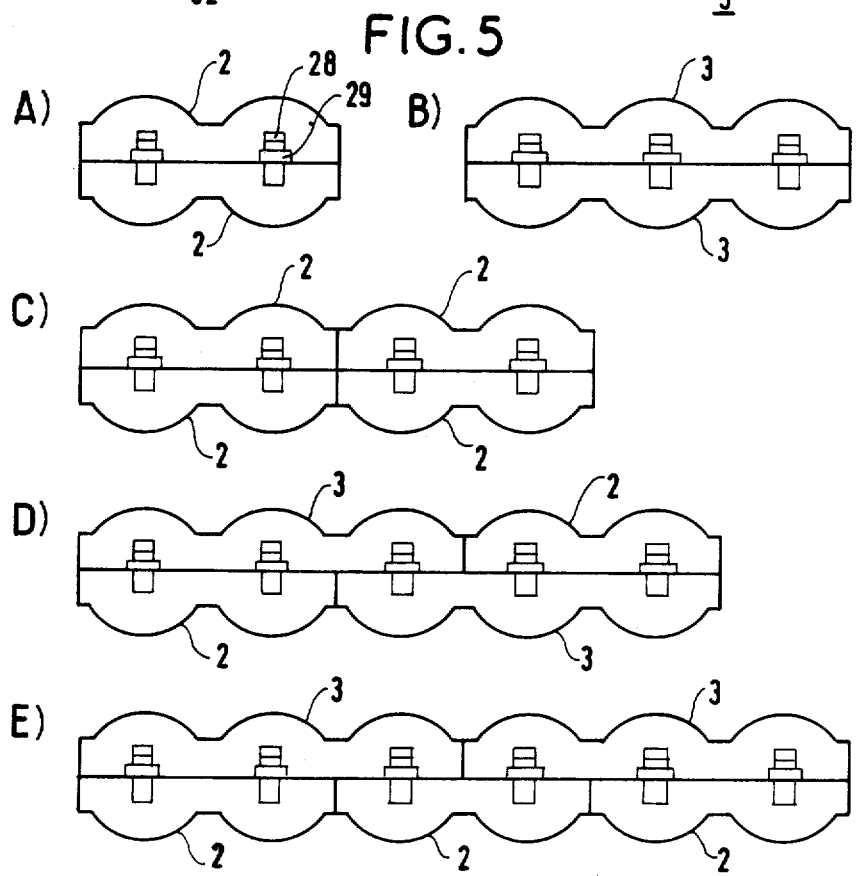
FIG. 5 illustrates schematically five configurations A, B, C, D, E for casings in accordance with invention.

FIG. 5 illustrates very schematically five possible configurations:

A: a casing with two modules 2 for two electric cells.

B: a casing with two modules 3 for three electric cells.

C: a casing for four electric cells and comprising two identical half casings constituted by pairs of modules 2.

D: a casing for five electric cells having an upper half casing constituted by a module 3 followed by a module 2 and a lower half casing constituted by a module 2 followed by a module 3.

E: a casing for six electric cells having an upper half casing constituted by two modules 3 and a lower half casing constituted by three modules 2.

Of course, any other combination is possible.

Figure 6:
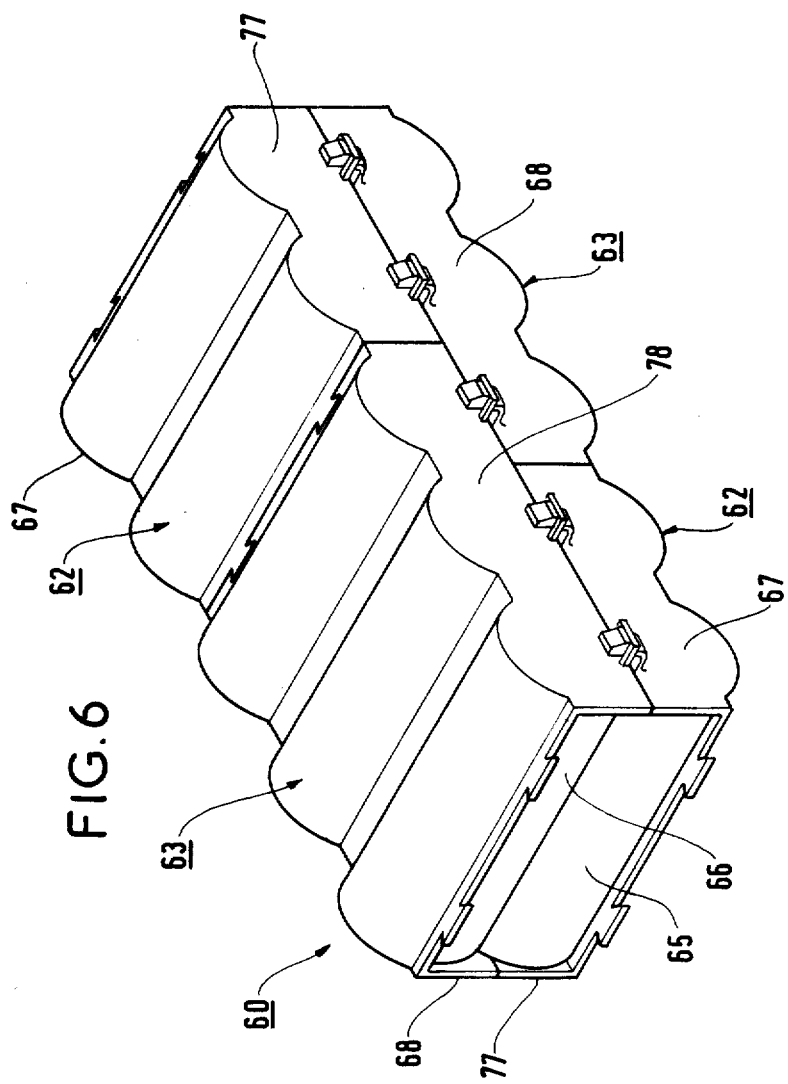
FIG. 6 is a perspective illustration of a casing in accordance with the invention containing two rows of electric cells.

FIG. 6 illustrates a casing 60 which contains two rows 65 and 66 of juxtaposed electric cells.

The upper half casing has a three-cavity module 63 followed by a two-cavity module 62, while the lower half casing has a module 62 followed by a module 63.

The modules 62 and 63 are identical in all respects to the previously described modules 2 and 3 except that base plates 67, 68, 77 and 78 are higher than the base plates 26, 27, 36 and 37 so as to accomodate both rows of cells 65 and 66. The means for fixing the modules are unchanged.

Of course, the invention is not limited to the embodiments described and illustrated. There can be any number of cell-receiving cavities.

The latch and eye and the dovetail fixing means can be replaced by any equivalent fixing means.

I claim:

1. A casing for a battery of cylindrical electric cells lying parallel to one another, wherein the casing comprises interconnected first and second insulating half casings with each half casing comprising at least one module having n and one module having n+1 part cylindrical cell-receiving cavities extending parallel to one another between base plates which are orthogonal to the axes of said part cylindrical cavities, the end edges of the cavities being provided with respective first complementary interfitting portions to enable a plurality of modules to be connected end-to-end to increase the number of side-by-side cell-receiving cavities in a half casing, and the base plates being provided with respective second complementary interfitting portions to enable the first and second half casings of any one battery to be assembled with the cavities facing each other.

2. A casing according to claim 1, wherein said casing is closed at its ends by two end plates which co-operate with the end edges of the end modules.

3. A casing according to claim 1, wherein said complementary seconds interfitting portions are of the latch and eye type.

4. A casing according to claim 1, wherein said complementary portions designed to fit together are of the dovetail mortise and tenon type.

5. A casing according to claim 1, wherein said cavities are separated by intermediate ribs, said ribs being of a thickness such that they provide sufficient electric insulation between two neighbouring electric cells.

6. A casing according to claim 1, wherein the height of said orthogonal base plates is chosen so that said casing contains at least two superposed rows of electric cells.

7. A molded insulating casing for a battery of cylindrical electrical cells, the casing comprising two half casings, each half casing including at least two modules assembled in the form of an open box having a base wall formed with at least 2n+1 part cylindrical cell-receiving cavities, n being an integer, such that each half casing has the same total number of cell-receiving cavities, and the two half casings together include two modules having n cell-receiving cavities and two modules having n+1 cell receiving cavities, the cavities having axes arranged in parallel coplanar relation, and each module having two spaced apart end edges parallel to the axes of the cavities, said end edges being provided with respective first complementary interfitting portions to enable a plurality of said modules to be connected end-to-end to form said half casings, and each module having two spaced apart side walls perpendicular to the axes of the part cylindrical cavities, said side walls being provided with second complementary interfitting portions for releasably locking together the two half casings with the part cylindrical cavities of said half casings facing each other.

8. An enclosed casing according to claim 7 wherein said second complementary interfitting portions comprise a resilient latch member associated with each part cylindrical cavity on one side wall of each module and a latch-receiving eye associated with each part cylindrical cavity on the other side wall of each module.

9. An enclosed casing according to claim 7 wherein each half casing comprises an assembly of one of said modules having two part cylindrical cavities end-to-end with one of said modules having three part cylindrical cavities to provide a total of five cell-receiving cavities in each half casing, the modules of one half casing being assembled in reverse order with respect to the modules of the other half casing, such that the interfaces between the modules of each half casing are offset when the two half casings are interlocked together.

10. An enclosed casing according to claim 7 wherein one half casing comprises an end-to-end assembly of two of said modules each having three part cylindrical cavities, and the other half casing comprises an end-to-end assembly of three of said modules each having two part cylindrical cavities, whereby each half casing has a total of six cell-receiving cavities, and the interfaces of the modules of each half casing are offset when the two half casings are interlocked together.

11. An enclosed casing according to claim 7, wherein the width of said side walls of each module is selected to provide a depth of the cell receiving cavities in the module greater than one cell diameter, whereby the assembled two half casings will accommodate at least two superposed rows of electric cells.

12. An enclosed casing according to claim 7 wherein each half casing comprises an assembly of one of said modules having n part cylindrical cavities end-to-end with one of said modules having n+1 part cylindrical cavities to provide a total of 2n+1 cell-receiving cavities in each half casing, the modules of one half casing being assembled in reverse order with respect to the modules of the other half casing, such that the interfaces between the modules of each half casing are offset when the two half casings are interlocked together.

13. A molded insulating casing for a battery of cylindrical electrical cells, the casing comprising two half casings, each half casing including at least one module assembled in the form of an open box having a base wall containing at least n+1 part cylindrical cell-receiving cavities, n being an integer, such that each half casing has the same total number of cell-receiving cavities, and the two half casings together include at least one module having n cell-receiving cavities and one module having n+1 cell-receiving cavities, the cavities having axes arranged in parallel coplanar relation, and each module having two spaced apart end edges parallel to the axes of the cavities, said end edges being fitted with respective first complementary interfitting portions to enable a plurality of said modules to be connected end-to-end to form said half casings, and each module having two spaced apart side walls perpendicular to the axes of the part cylindrical cavities, said side walls being provided with second complementary interfitting portions for releasably locking together the two half casings with the part cylindrical cavities of said half casings facing each other.

14. An enclosed casing according to claim 13 wherein one of said half casings comprises at least one module having n+1 cell-receiving cavities, and the other of said half casings comprises at least two modules having n cell-receiving cavities.

* * * * *